United States Patent
Maxwell et al.

(10) Patent No.: US 6,567,860 B1
(45) Date of Patent: May 20, 2003

(54) METHOD AND APPARATUS FOR NEW DEVICE DRIVER INSTALLATION BY AN OPERATING SYSTEM

(75) Inventors: Randall K. Maxwell, Oregon City, OR (US); Bharani K. Pedapati, Hillsboro, OR (US); F. Jay Decker, Enumclaw, WA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/183,336

(22) Filed: Oct. 30, 1998

(51) Int. Cl.$^7$ ................................................. G06F 9/00
(52) U.S. Cl. ....................... 709/327; 717/100; 717/171; 713/100; 713/1; 710/10; 710/8
(58) Field of Search ................................ 709/321–327; 717/100, 101, 120–123, 174, 175, 176, 177; 713/1, 100; 710/8, 10, 15, 14

(56) References Cited

U.S. PATENT DOCUMENTS

| | | | |
|---|---|---|---|
| 4,974,151 A | * 11/1990 | Advani et al. | .................. 710/8 |
| 5,319,751 A | 6/1994 | Garney | |
| 5,548,759 A | * 8/1996 | Lipe | ........................... 707/100 |
| 5,555,401 A | 9/1996 | Allen et al. | |
| 5,668,992 A | * 9/1997 | Hammer et al. | ................ 713/1 |
| 5,723,282 A | 3/1998 | Fahy et al. | |
| 5,748,980 A | * 5/1998 | Lipe et al. | ....................... 710/8 |
| 5,752,032 A | 5/1998 | Keller et al. | |
| 5,826,090 A | * 10/1998 | Mealey et al. | .............. 717/162 |
| 5,870,610 A | * 2/1999 | Beyda | ........................ 717/173 |

OTHER PUBLICATIONS

Microsoft Corporation. "MS Windows NT Workstation 4.0 Resource Guide." Microsoft Online, 1995.*
Microsoft Corporation. "Using an Answer File for an Unattended Installation." Microsoft Online. Article ID: Q136153, Jun. 1997.*
Person, Ron. "Using Windows 95." QUE Corporation. p. 243–264, 1995.*
Hurwicz, M, "Managing PC Costs," Byte Magazine, vol.23, No. 7, pp. 65 (Jul. 1998).
Intel Corporation, Intel Networking White Paper, Deploy, Manage & Protect; A step–by–step solution for getting control of networked PCs and servers, www.intel.com/network/doc/8728/index.htm, (1998).
Intel Corporation, "Overview of Wired for Management (WfM)," developer.intel.com/ial/WfM/tools/ndmi2snmp/idfwfm.htm, (1998).
Microsoft Corporation, *Microsoft Windows '95 Resource Kit*, pp. 1157–1173, Microsoft Press (1995).
**Microsoft Corporation, *Microsoft Windows '98 Resource Kit*, Microsoft Press (1998).
**Microsoft Corporation, *Microsoft Windows NT Workstation Operating System* , Deployment Guide, Automating Windows NT Setup, Microsoft Corporation (1997).
Microsoft Corporation, "Systems Management Server 1.2—Overview," www.microsoft.com/products/prodref/155_ov.htm, (1998).
Minasi, M., "Automatically Install Display Drivers; Unattended installations for systems with video drivers NT doesn't recognize," Windows NT Magazine, pp. 63–64 (Oct. 1998).
**Platinum Technology, AutoConfigure Administrator's Guide, Version 2.1 (Oct. 1998).

* cited by examiner

Primary Examiner—St. John Courtenay, III
Assistant Examiner—Lewis A. Bullock, Jr.
(74) Attorney, Agent, or Firm—Cooper & Dunham LLP

(57) ABSTRACT

A method and apparatus are disclosed for inputting new device driver information into a Personal Computer (PC) in an existing computer network so as to enable the Operating System (OS) to recognize the new hardware device during installation of the OS and to permit the OS to automatically install the associated device driver.

16 Claims, 6 Drawing Sheets

An Exemplary General Purpose Computer

General Architecture

Add Driver to Windows 95/98/NT Setup

METHOD AND APPARATUS FOR NEW DEVICE DRIVER INSTALLATION BY AN OPERATING SYSTEM

CROSS-REFERENCE TO RELATED APPLICATIONS

This application is related to application Ser. No. 09/187,102 entitled "Method and Apparatus for Operating System Personalization During Installation" filed Nov. 5, 1998.

TECHNICAL FIELD

This invention relates to the field of Computer Systems. More specifically, the invention relates to computer systems supporting an interface for installation of device drivers. The invention provides an apparatus and method for entering new device driver information into an existing system of computers which make use of various Microsoft Windows™ operating system programs.

BACKGROUND ART

It is desirable that installing a Personal Computer (PC) and more specifically installing a new feature on an existing PC be as easy as possible. However, the architecture of the computer and its configuration of devices such as display, mouse, sound capabilities, attached camera, storage devices, etc. must be thoroughly understood by the Operating System (OS) which is to run the computer. The OS must be programmed to access all of the hardware devices attached to the computer in order for it to operate properly. The communication between a hardware device and the OS is supplied by a Device Driver, typically a software or firmware system created specifically to talk to (or "drive") the device, the device driver being connected or hooked to the OS. This Device Driver is typically supplied by the manufacturer of the related device. When a new device is attached to a PC its device driver must be "installed" so that the OS can communicate with the device. The installation of new devices and their device drivers on existing systems is excessively error prone and time consuming. Accordingly, there is a strong need to automate the process of device driver installation.

For example, during installation of an OS on a PC, the Operating System software can only deal with hardware devices that were known and available at the time the Operating System was built. This often leads to problems installing the Operating System on newer hardware where the user must run through several manual steps in order to configure the new device driver and this only works after the Operating System has been installed. It is extremely difficult for a Microsoft PC system user to understand how to make this work by reading the Microsoft documentation for Windows 95™, Windows 98™ and Windows NT™ 4.0.

Numerous United States Patents exist on inventions touching on the area of Device Drivers including U.S. Pat. No. 5,319,751—Device driver configuration in a computer system U.S. Pat. No. 5,555,401—Self Configuring device system U.S. Pat. No. 5,723,282—Virtual Device Registry having a globally unique identifier supplying virtual driver call information to the requesting program; and U.S. Pat. No. 5,752,032—Adaptive device driver using controller hardware sub-element identifier.

However none of these patents address the fundamental issue of providing a useful tool to a user for inputting new device driver information into a PC in an existing computer network so as to permit an existing OS to easily configure itself to communicate with the new device.

As more and more businesses develop enterprise wide computer systems to support their critical business applications, these businesses are searching for cost-effective methods of administering these company-wide systems. These businesses, recognizing that approximately four-fifths of the total cost of ownership (TCO) of a computer system resides in the administration and maintenance of the computers, resort to more controlled management practices and tools to reduce this TCO. Microsoft has reacted to this pressure to reduce systems administration costs by targeting system update and application installation, central administration, system lock down, and easy client replacement as functions to reduce TCO. Their solution is its System Management Server (SMS)™, which provides automated software distribution and upgrades, hardware and software inventory of each machine, and remote control and remote diagnostics. SMS is supported in Windows 95™, Windows 98™ and Windows NT™4.0.

Intel's umbrella term for their TCO initiatives is "Wired for Management" ("WfM"). The WfM Baseline provides a minimum set of management capabilities for Personal Computer (PC) designers and systems management application vendors. It focuses on hardware/firmware based capabilities such as remote wake-up, Preboot Execution Environment (PXE) on clients, hardware sensors, and BIOS-based capabilities. Platinum Technology's AutoConfigure™ System (which was originally called Intel's LANDesk Configuration Manager™ (LCM) system), is a system for end-user organizations and is designed primarily to automatically install software on networked PCs. It is a PXE server also so it can install the Operating System, and other low-level software, in addition to applications. Platinum's AutoConfigure system and Microsoft's SMS systems are used by most large enterprises today to control their PC networks and their TCO.

The Windows Operating Systems and the AutoConfigure System (see LANDesk Configuration Manager) are described in the following documents which are incorporated fully herein by reference:

"Microsoft® Windows®95 Resource Kit" 1995 Microsoft Press,

"Microsoft® Windows®98 Resource Kit" 1998 Microsoft Press, ISBN 1-57231-644-6

"Microsoft® Windows®NT Workstation" Operating System, Deployment Guide", 1997 Microsoft Corporation.

"Intel LANDesk® Configuration Manager, Administrator's Guide, 1997 Intel Corporation.

"Guide to Automating Windows NT Setup" for installing Windows NT drivers during Windows NT installation.

There is a need in these systems to enable the user to easily provide information on new devices and their drivers so as to minimize system start-up difficulties due to loading of the Operating System without knowledge of the new device and its driver.

The present invention is described below in terms of its preferred embodiment as an adjunct to the Platinum Auto-Configure System (formerly called the Intel LANDesk Configuration Manager™ (LCM) system, which is now owned by Platinum Technology (the assignee of the present invention) and which was first publicly shipped as a part of the 1.5 version of the LCM system on Nov. 7, 1997.

SUMMARY OF THE INVENTION

The present invention includes a method for providing device driver code for a newly installed device so as to permit an existing operating system to communicate with the device driver. The method includes steps of inputting the device driver code into a file in a computer wherein the file has a unique file identification; invoking an add-device tool on the computer, inputting into this add-device tool data representing the unique file identification of the file containing the device driver code, a pointer to the answer file used by the operating system and to the OS installation files used by the operating system; and executing a portion of the add-device tool to modify the answer file used by the operating system and the OS installation files used by the operating system, to include information and code obtained from the file containing the device driver, whereby the operating system can use these modified answer file and OS installation files to configure itself to communicate with the new device using the device driver code.

The method claimed may also include steps wherein the add-device tool, upon being invoked, causes a special graphical user interface (GUI) window to be displayed, facilitating the device driver data input through the use of this GUI window.

The invention also includes an apparatus having a computer and various peripherals arranged to permit an existing operating system to configure itself to communicate with device driver code, wherein the apparatus includes device driver code and related information stored in a file having a unique file identification; having an add-device tool stored in the system memory; and having code mechanisms to invoke the add-device tool which is configured to permit a user to easily input the unique file identification for the file containing the device driver code and related information and to input a pointer to answer file and OS installation files used by the operating system; and having a code mechanism which can modify the answer file and OS installation files used by the operating system with code and data for the device driver, whereby the operating system can subsequently configure itself to communicate with the new device driver. The apparatus is also claimed containing a graphical user interface window (GUI) which is used to facilitate the input to the device driver and OS files information. The invention also includes a computer program product for providing this same capability which is embedded on a computer readable medium.

Other embodiments of the present invention will become readily apparent to those skilled in these arts from the following detailed description, wherein is shown and described only the embodiments of the invention by way of illustration of the best mode known at this time for carrying out the invention. The invention is capable of other and different embodiments some of which may be described for illustrative purposes, and several of the details are capable of modification in various obvious respects, all without departing from the spirit and scope of the present invention.

BRIEF DESCRIPTION OF THE DRAWINGS

The features and advantages of the apparatus and method of the present invention will be apparent from the following description in which.

BEST MODE FOR CARRYING OUT THE INVENTION

Figure 1:
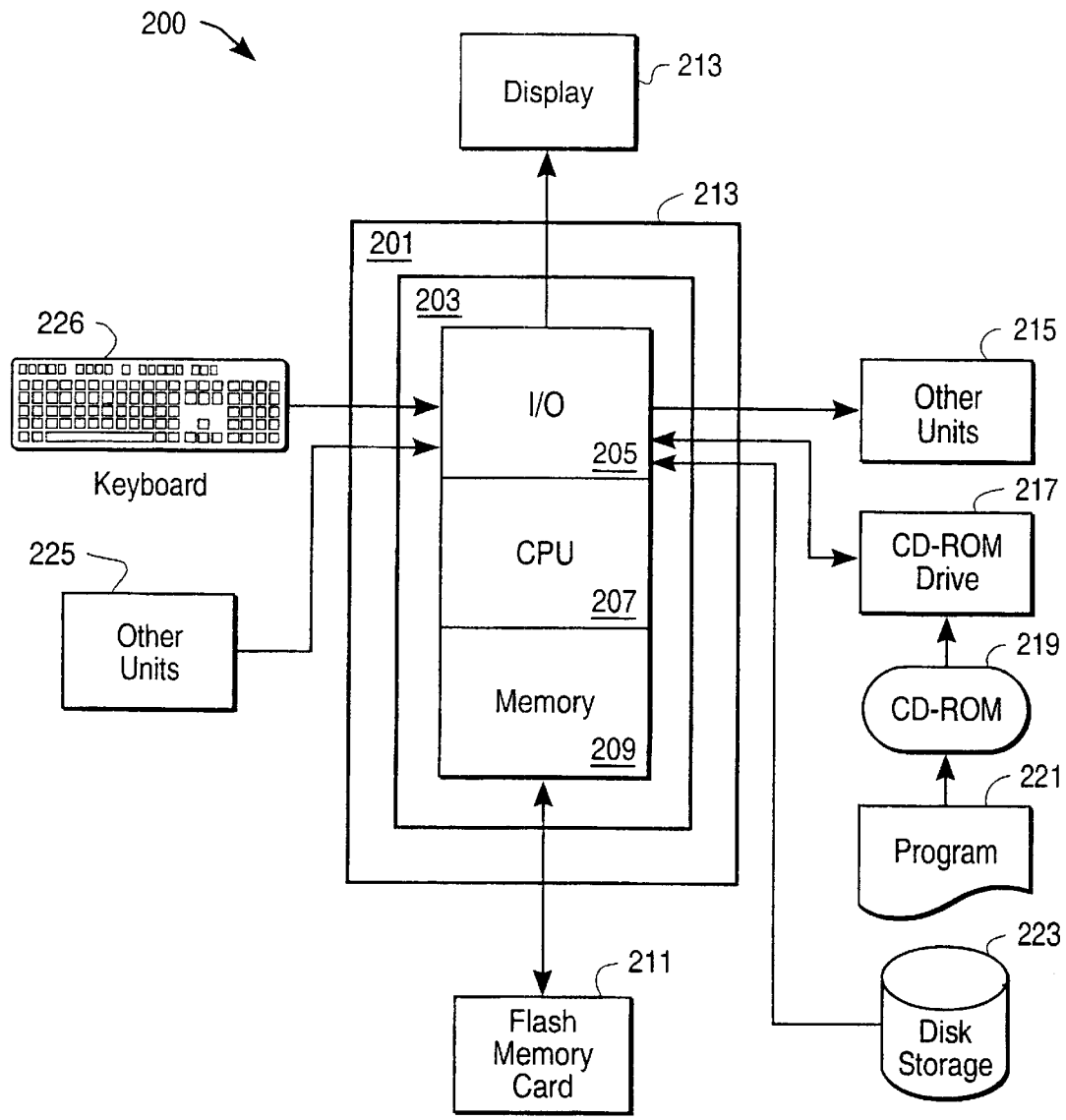
FIG. 1 illustrates a representative general purpose computer configuration.

A method and apparatus are disclosed for inputting new device driver information into a Personal Computer (PC) in an existing computer network so as to enable the Operating System (OS) to recognize the new hardware device during installation of the OS and to permit the OS to automatically install the associated device driver. In the following description for purposes of explanation, specific data and configurations are set forth in order to provide a thorough understanding of the present invention. However, it will be apparent to one skilled in these arts that the present invention may be practiced without the specific details. In other instances, well known systems and protocols are shown and described in diagrammatical or block diagram form in order not to obscure the present invention unnecessarily.

| Terminology: | |
|---|---|
| Term | Definition |
| Device | A generic term for a computer component, such as a printer, serial port, disk drive, mouse, display, sound card, camera, etc. A device frequently requires its own controlling software called a device driver. |
| Device Driver | A program that enables a specific piece of hardware (the "device") to communicate with a computer Operating System (OS). Although a device may be attached to a computer, typically the OS cannot recognize the device until the user has installed and configured the appropriate driver. |
| INF File | Vendor specific INF file for driver information. Windows INF file This is a file that provides Windows 95/98/NT Setup with the information required to set up a device, such as a list of valid logical configurations for the device, the names of driver files for the device, etc. An INF file is typically provided by the device manufacturer. |
| INF file format | Windows INF file formats are described in detail in Appendix C in the Windows 95/98 Resource Kit documents. |
| OS Path | Directory where the Operating System files are located, generally described in detail in the Windows 95/98 Resource Kit documents. |
| Answer file | A text file that typically contains pre-defined answers to questions that might arise during installation (installation prompts). For example, a user might be prompted to enter a name, a serial number, a preferred language, etc. By pre-typing the answers to these questions in a text file an administrator can help users install software on PCs in unattended mode. Not all software comes with answer file capabilities, and answer files may be called by other names. The format of an answer file is typically relatively simple, consisting of three components: sections (specifying groupings of similar keywords), keywords (corresponding to the prompts that typically occur when an application installs), and values (responses to the requests for input). |
| Hardware tree | In Windows systems, a record in Random Access Memory of the current system configuration, based on the configuration information for all devices in the hardware branch of the Registry. |
| Registry | In Windows 95/98/NT systems, the Registry is the database repository of information about a computer's configuration. |
| Setup | In Windows 95/98/NT systems, Setup is a program designed to guide the user/administrator in installing the particular operating system and in customizing the installation for the particular hardware and user through the use of pre-programmed configurations, safe defaults, and various automated hardware detection processes. |

OPERATING ENVIRONMENT

The environment in which the present invention is used encompasses the general distributed computing scene which includes generally local area networks with hubs, routers, gateways, tunnel-servers, applications servers, etc. which may be connected to other clients and other networks via the Internet, wherein programs and data are made available by various members of the network for execution and access by other members of the network. The client machines are typically Personal Computers (PCs).

In the preferred embodiment, the LANs are composed of clients and servers running Microsoft Windows Operating Systems (95/98/NT) whose operating environments are generally controlled by either the Microsoft Systems Management Server (SMS) or the Platinum AutoConfigure System.

The computer system of the preferred embodiment includes generally the elements shown in FIG. 1, wherein an exemplary general purpose computer 200 includes a cabinet 201 which includes a motherboard 203 having thereon an input/output ("I/O") section 205, one or more central processing units ("CPU") 207, and a memory section 209 which may have a flash memory card 211 related to it. The I/O section 205 is connected to a keyboard 226, other similar general purpose computer units 225, 215, a disk storage unit 223 and a CD-ROM drive unit 217. Alternatively the CD-ROM unit may be replaced by a floppy disk drive unit in some such systems. The CD-ROM drive unit 217 can read a CD-ROM medium 219 which typically contains programs 221 and other data. Logic circuits or other components of these programmed computers will perform series of specifically identified operations dictated by computer programs as described more fully below.

Figure 2:
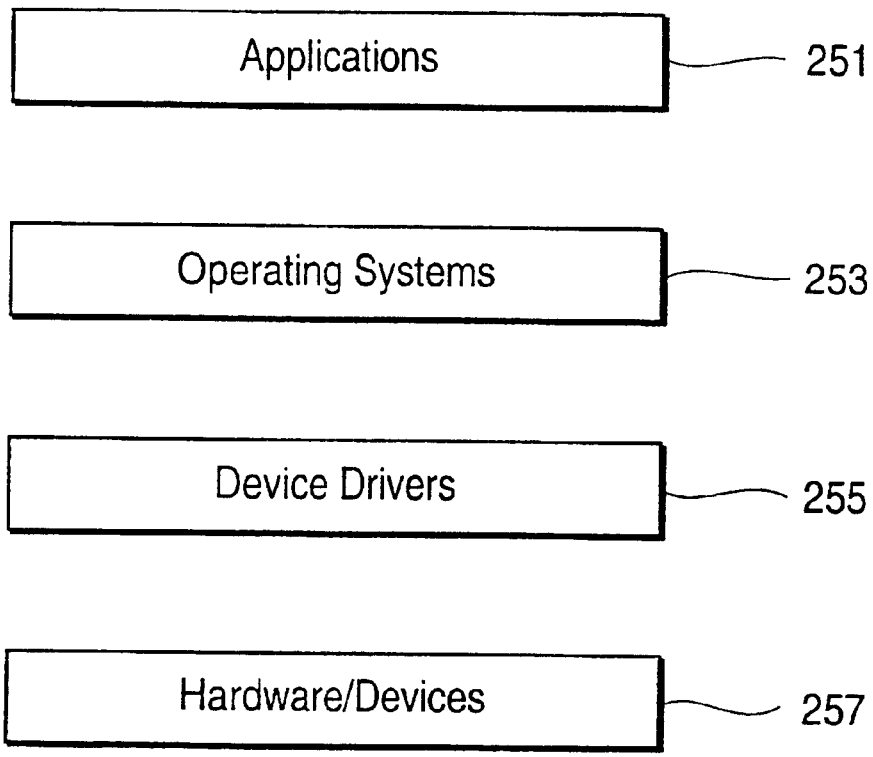
FIG. 2 depicts a general Operating System architecture.

FIG. 2 is a general chart showing the relationship between the operating system, device drivers and computer hardware/devices. In FIG. 2 application programs 251 interface with an operating system 253, which in turn communicates with various device drivers 255, which control the various related hardware devices 257 which make up a particular computer architectural configuration. Whenever a new device is added to the hardware configuration 257 generally a corresponding device driver for that new device must be added to the device driver section 255 and connections made with the operating system 253 so that the operating system can communicate with the new piece of hardware.

In Windows based systems, the Windows Setup program during system install, detects the hardware devices and components which are already configured on the computer and uses this information to install drivers and set Registry entries. If a user installs support manually for a hardware component that does not appear in the "Readme" file and "Setup.txt" files of the Setup program as being a supported device by the OS, then the user must add the device driver(s) to the system hardware tree and Registry. The present invention provides an automated assist in making the necessary entries as effortless as possible.

THE INVENTION

Figure 3:
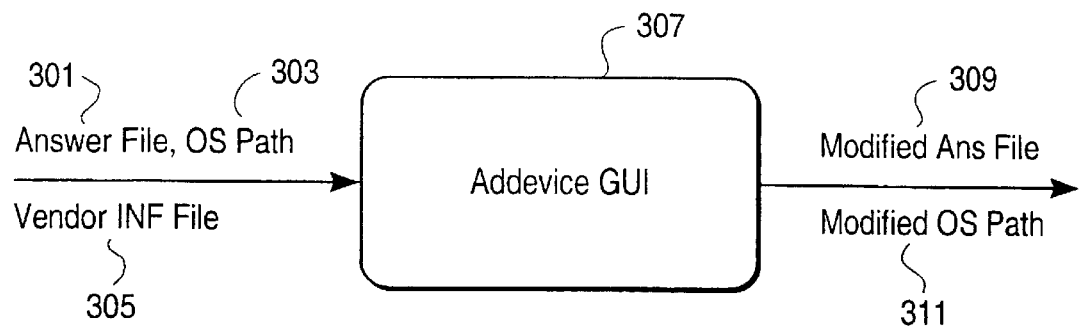
FIG. 3 depicts the general interactions of the present invention

The present invention is an apparatus and method for automating the addition of a device driver for a newly installed device for which an existing Operating System may not be configured. In the preferred embodiment, the general process of the invention is depicted in FIG. 3. Referring to FIG. 3 a vendor INF file 305 which contains data and code for and about a newly installed device is identified to an add-device tool by means of a graphical user interface (GUI) 307. Also identified via the GUI 307 are pointers to an OS answer file 301 and to the OS source path 303. The add-device tool takes these inputs and modifies the answer file 309 and OS installation files 311 to add the data and code relating to the new device driver and outputs these files for later use by the OS.

Figure 4:
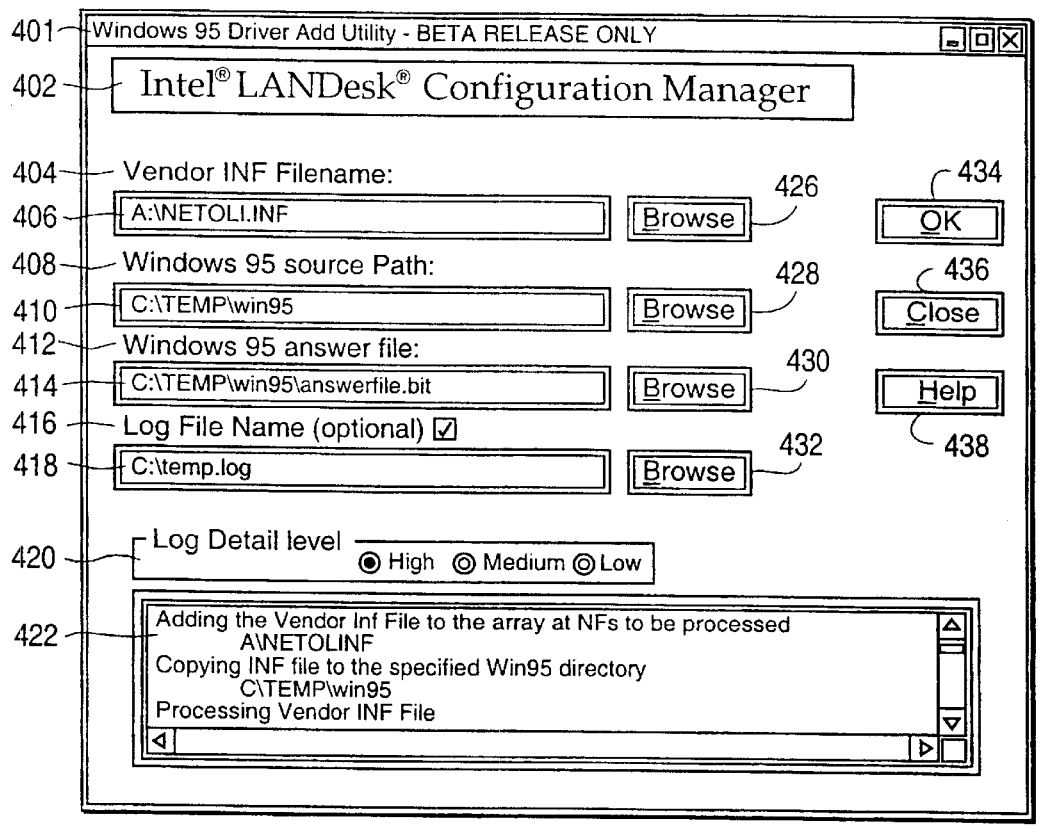
FIG. 4 illustrates an exemplary GUI window for entering device driver data.

Graphical User Interface:

In the preferred embodiment, the add-device tool has been provided as a separate utility. Referring now to FIG. 4 an exemplary graphical user interface (GUI) is shown. This GUI is displayed to the user when the add-device tool is invoked. The GUI shown is labeled "Windows 95 Driver Add Utility—Beta Release only" 401 however in the preferred embodiment the GUI for Windows 95/98/NT is the same as that shown in FIG. 4 except the "titles at 401 refer as 95/98/NT. In the preferred embodiment the GUI is used in conjunction with the Platinum AutoConfigure System as labeled "Intel LANDesk Configuration Manager" 402. Using the GUI, the user has to enter the Vendor INF file name 406 in the box labeled "Vendor INF Filename" 404, the Windows Source path 410 in box 408, the Answer file that is going to be used 414 in box 412 and the name of a log file (optional) 418 in box 416. The log file 418 is an ordinary text file which contains the event log of the program. A status bar 422 is shown to the user about the activity of adding the driver's information, depending on the user's selection of the Log detail level 420. The user can use the log file at a later stage, to trouble shoot the reason for the driver not being added in case of the tool's failure to add the drivers to the OS installation files. User selection is validated for the INF file by verifying the version section of the file (which is described further below). User selection of OS path is validated for the existence of the directory and whether it is writeable or not. The system gets all the driver information from the INF file and updates the Answer file and the Custom.Inf file in the source path. If the Custom.Inf file doesn't exist, the tool will create one and adds the required sections to it. If the user has completed the data entry he clicks on the "OK" button 434 and then clicks the close button 436. If at any point in the process the user is unsure of what to enter he can click on the "Help" button 438 and a separate "help" GUI will be displayed indicating general instructions for what must/can be done for each entry required.

Figure 5:
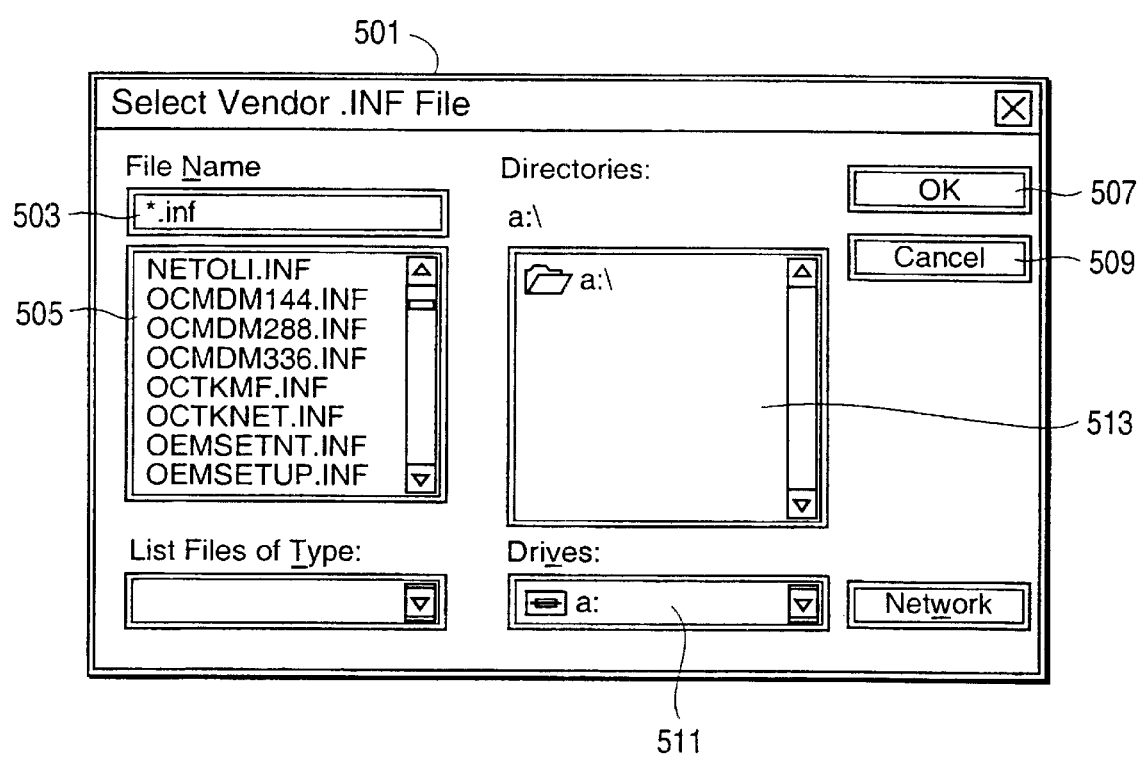
FIG. 5 illustrates an exemplary GUI window for support of entry of device driver and other file data.

The user can either enter,the filename, and paths (as indicated in 406, 410, 414 and 418) or he can use the browse button 426, 428, 430 or 432 to select the required files and directories. If the user selects any of the browse buttons he will get a screen like the one shown in FIG. 5. The GUI in FIG. 5 is labeled "Select Vendor.INF File" 501 which would be the GUI which is displayed if the user clicked on the browse button 426 in FIG. 4 opposite to the "Vendor.INF Filename" box (406 in FIG. 4). Similar GUIs would be displayed for the other browse buttons (428, 430 or 432 in FIG. 4) and the title bar 501 would display the appropriate title. Using this GUI the user can select a disk drive 511 containing the device driver files and directories, a directory 513 to indicate a specific set of files 505 contained in the directory, and can then select the specific INF filename from among those displayed in box 505. The one selected would be displayed in the "file Name" box 503 and if that is the one desired by the user he would click on the "OK" button 507 and the file name selected will be transferred to the appropriate box in the GUI shown in FIG. 4 If the user is not satisfied with the file name selected he can click on the "cancel" button 509 and begin the browse operation again.

PROCESS

Figure 6:
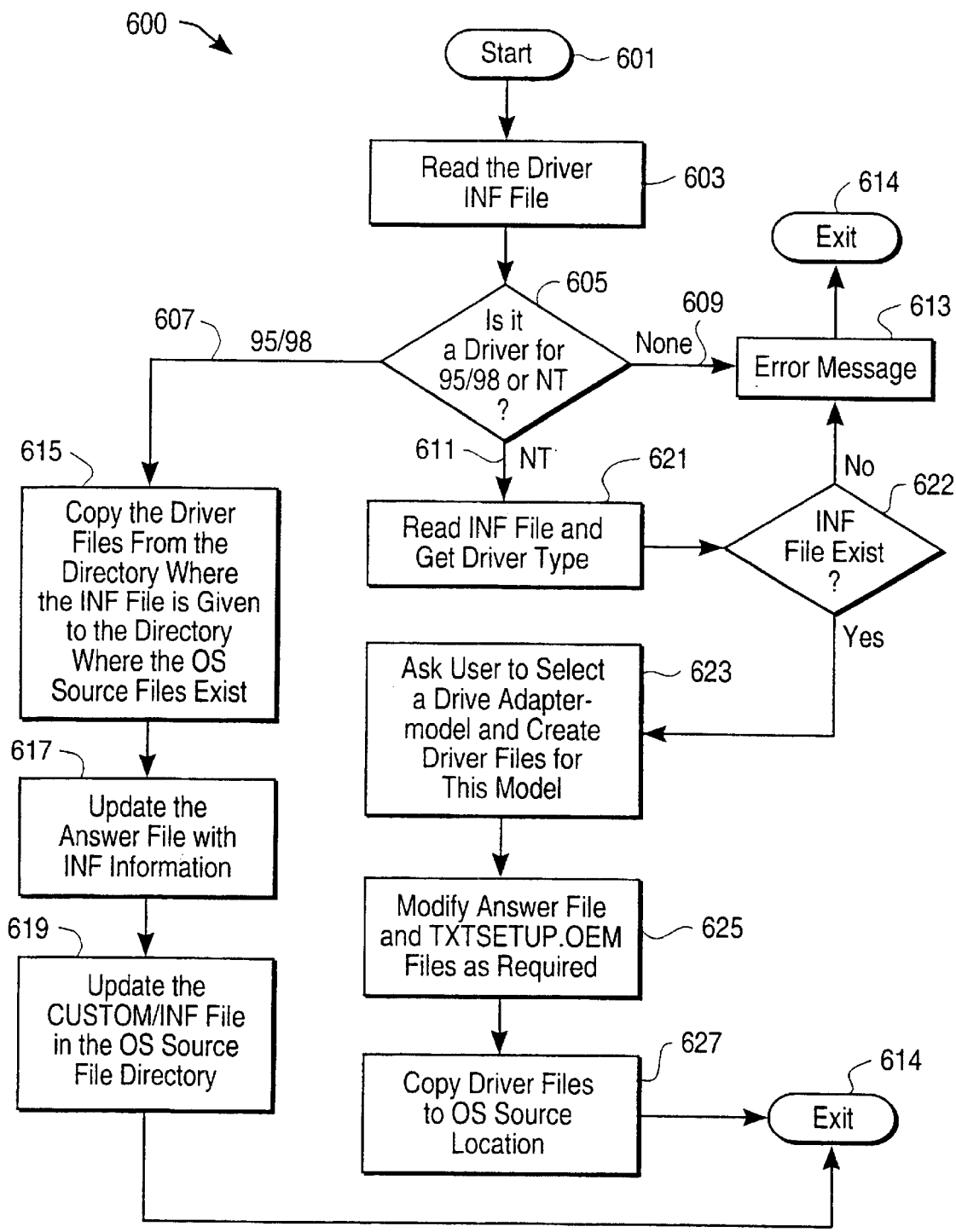
FIG. 6 illustrates a flow-chart of the general operation of the method of the current invention.

Adding a driver in Windows OS Setup depends greatly on whether it is being added to the Windows* 95/98 or Windows NT. As indicated above, the inputs for adding a driver are the INF file, answer file, OS source path and the output is a modified answer file, modified OS installation files. In the preferred embodiment the process is depicted in FIG. 6. Referring now to FIG. 6 when the file names and path names have been inputted into the add-device GUI and the "OK" button is clicked (434 in FIG. 4) the add-device tool begins the process of adding the driver data to the Windows Setup files 601. The designated Driver INF file is read 603 and a determination is made as to whether the driver is for windows 95/98 or NT 605. If it is for neither 609, an error message is displayed 613 and the process exits 614. In the preferred embodiment, determining whether it is a Windows 95 INF file requires a check for "Signature" key under "Version" section. (Note that the format for an INF file is shown in Appendix C of the Windows 95 Resource Kit document which is incorporated fully herein by reference). The value should be one of the following values;

"$CHICAGO$",

"$Windows95$"

"$Windows 95$"

For Example:

[version]

LayoutFile=layout.inf signature="$CHICAGO$"

Class=Net provider=%V_MS %

If the "signature" value matches one of the above then it is determined to be a Windows 95/98 type INF file 607 and the process proceeds to copy the files from the directory where the INF file is given to the directory where the OS source files exist 615. This file copying process proceeds as follows:

For all the CopyFiles sections of the INF file, get their values. These values are either sections under which the actual files are specified or the actual files themselves. These values are separated by ',' and hence broken to individual strings before finding out whether they are actual files or sections indicating where to look for the actual files. If the first character of the value is preceded by '@' then this is the actual file otherwise it is the section under which actual files are specified.

Read the file sections for actual file names. These sections are formatted as <destination-filename> [,[<source-directory>\]<source-filename> ] [,temporary-filename] [,flag]. NOTE: The <source-filename> is the same as the <destination-filename> if the <source-filename> parameter is NOT present. The source is the source directory from which the INF file is read. We read files and directories from the INF location and copy them to the OS installation file location.

For example:

; Install NDIS3

[E100B.ndis3]

CopyFiles=E100B.ndis3.CopyFiles

[E100B.ndis3.CopyFiles]

e100b.sys, nt\e100b.sy_ ; nt is the subdirectory

; Install NDIS2

[E100B.ndis2]

CopyFiles=E100B.ndis2.CopyFiles

[E100B.ndis2.CopyFiles]

e100b.dos, ndis\e100b.dos

The values for the CopyFiles" keys are "E100B.ndis3.CopyFiles" and "E100B.ndis2.CopyFiles".

Since these values are not preceded by '@' they are names of the file sections.

Reading the sections "E100B. ndis3.CopyFiles " and "E100B.ndis2.CopyFiles" and we get "e100b.sys, nt\e100b.sy_" and "e100b.dos, ndis/e100b.dos". From these values we determine that the files are e100b.sy_ and e100b.dos and their relative directories are nt and ndis respectively. We copy the files from A:\E100B\NT\E100B.SY_ and A:\E100B\NDIS\e100b.dos to \\LCM_1234\OS\WIN95\NT\E100B.SY_ and \\LCM_1234\OS\WIN95\NDIS\E100B.DOS (where A:\E100B is INF directory and \\LCM_1234\OS\WIN95 is the OS source).

Finally the INF file is copied to OS source directory.

Next the Answer file is updated 617. This is done as follows:

We update the answer file with INF information so that Windows* 95/98 Setup will copy the needed driver files. We update the following entries in the answer file:

[Install]

This section sets parameters for copying additional files as part of Windows* 95 installation. We append the "Inf Copy" value to the "CopyFiles" key under the "Install" section (the "Inf.Copy" section is the section under which files to be copied are listed).

[Install]

CopyFiles=Inf.Copy

[Inf.Copy]

Write the actual INF file name as a key under this section so that Windows* 95 Setup picks up this file and copies it to the OS source directory.

[Inf.Copy]

nete100b.inf= where nete100b.inf is the INF file name.

[DestinationDirs]

This section defines the destination directories for the above [Inf.Copy] sections

[DestinationDirs]

Inf Copy=17

Here 17 is the INF directory. For the values refer to "Microsoft Windows 95 Resource Kit" from Microsoft Press.

Finally the CUSTOM.INF file is updated 619. This is done as follows:

We update the CUSTOM.INF file in the OS source directory in case the answer file uses custom setup instead of the typical installation.

(In the answer file the custom setup can be chosen by specifying the value "3" for "Install Type" under the "Setup" section)

We write the following sections in the "CUSTOM.INF" file. [Version]

Signature=$CHICAGO$; For Windows 95

[Custom_Precopy]

CopyFiles=PrecopyFiles

[PrecopyFiles]

e100b.sy_= e100b.dos= e100bodi.com= nete100b.inf=

Note: the above values are for example only. The actualfiles depends upon the actual driver.

Copy file sections described as in CopyFiles item.

[DestinationDirs]
PrecopyFiles=2
   2 is temporary setup directory.
[SourceDisksNames]
1=Disk_1_Desc,, 0
Identifies and names the disks used for installation of the given device drivers.

Here 1 identifies one source disk and assigns it ordinal 1 and "Disk_1_Desc" as a description

[SourceDisksFiles]
filename=disk-number
Names the source files used during installation and identifies the source disks that contain the files. The ordinal of the source disk defined in the disk-number must be defined in the [SourceDiskNames] section.

[SourceDisksFiles]
e100b.sy_=1,nt,11
e100b.dos=1,ndis,11
e100bodi.com=1,dos,11
nete100b.inf=1,,11

At this point the process for the Windows 95/98 driver add is completed and the process exits 614.

Referring again to FIG. 6 if the driver in the INF file is not for Windows 95/98 but rather for Windows NT 611 the driver type is determined. 621. If it is for Windows NT the value should be one of the following values;

"$WINDOWSNT$",

"$WindowsNT$"

"$Windows NT$"

For Example:

[version]

LayoutFile=layout.inf signature="$WINDOWSNT$"

Class=Net provider=%V_MS %

If the "signature" value matches one of the above then it is determined to be a Windows nt type INF file and the Add-Device tool tries to determine which of the following type the driver is.

Display.

Network.

SCSI.

Mouse.

If the INF file is Windows NT 4.0 format the type is determined by reading the "Class" key in [Version] section of the INF file, if the INF file is Windows NT 3.51 format the type is taken from "OptionType" key in [Identification] section. The INF file is read and information about the driver is extracted as follows:

if the type is "Display"—we get Adapter model.

if the type is "Network"—We get Adapter model.

if the type is "SCSI"—We get the SCSI model and driver files; and if the type is "Mouse"—We get the mouse model and driver files.

The process then displays all available adapter models supported by this driver. The user picks up a driver model from the displayed list. Then a list of driver files is created for this particular model. 623.

Next the tool modifies the answer file and txtsetup.oem files. 625 as follows:

If it is a Display—Modify only the answer file.

AddDevice writes the following information in the [Display] section.

[Display]
InfFile="FileName.inf"
InfOption="Driver String"
InstallDriver=1
BitsPerPel=16
XResolution=640
YResolution=480
VRefresh=60
AutoConfirm=1

If it is a Network type—We modify only the answer file.

The Add-Device tool writes the following information in the [Network] section.

E100BPCI=NetCardSection, \$OEM$\ADAPTERKEY

NetCardSection is the section with Network Interface Card (NIC) configuration parameters. If it is empty, Windows setup will detect them. \$OEM$\ADAPTERKEY is the directory with driver files. It is relative to the source path directory. ADAPTERKEY is determined when the user selects the adapter model from the list of supported adapters.

If it is a SCSI type—We modify answer file and txtsetup.oem files.

The Add-device tool writes the following information in the [MassStorageDrivers] section.

"Driver String"="OEM"

It writes also all the necessary driver files in [OemBootFiles] section.

The Add-Device tool also modifies the Txtsetup.oem file in \$OEM$\TEXTMODE directory, supplying list of the driver files.

If it is a Mouse Type—We modify the answer file and txtsetup.oem files.

The Add-Device tool writes the following information in the [PointingDeviceDriver] section.

"Driver String"="OEM". It also modifies the Txtsetup.oem file in \$OEM$\TEXTMODE directory supplying list of the driver files.

Finally, the add-device tool copies the driver files to OS installation files location 627 as follows:

Step 1—Copying the files from the source (the directory where the INF file is) to directory where the OS files are.

A special directory $OEM$ must be created under OS installation files directory. For SCSI and Mouse drivers the files must be copied into $OEM$\TEXTMODE directory. The process of determining which files are to be copied is described below. Windows NT requires all OEM files that will be installed during Text mode setup to be in the TEXTMODE directory under $OEM$.

For display drivers all of the files are copied into $OEM$\Display directory.

For network drivers all, the files are copied into a subdirectory of $OEM$ that has the name of the driver key. The driver key is the name of the key in [Options] section of the INF file. For example if the name of the driver key in the INF file is E100BPCI, all the files will be copied into $OEM$\E100BPCI directory.

Step 2.—For all the CopyFiles sections of the INF file, get their values. These values are either sections under which the actual files are specified or the actual files themselves. These values are separated by ',' and hence broken to individual strings before finding out whether they are actual files or sections to look in for the actual files. If the first character of the value is preceded by '@' then this is the actual file otherwise it is the section under which actual files are specified.

Read the file sections for actual file names. These sections are formatted as <destination-filename> [,[<source-directory>\]<source-filename>] [,temporary-filename] [,flag]. NOTE: The <source-filename> is the same as the <destination-filename> if the <source-filename> parameter is NOT present. The source is the source directory from which the INF file is read. We read files and directories from the INF location and copy them to the OS source files location.

For example:
; Install NDIS3
[E100B.ndis3]
CopyFiles=E100B.ndis3.CopyFiles
[E100B.ndis3.CopyFiles]
e100b.sys, nt\e100b.sy_ ; nt is the subdirectory
; Install NDIS2
[E100B.ndis2]
CopyFiles=E100B.ndis2.CopyFiles
[E100B.ndis2.CopyFiles]
e100b.dos, ndis\e100b.dos At this point the files necessary for NT to install the new driver have been modified and the add-device tool exits 614.

It is noted that one cannot remove the driver information from answer file once it is inserted therein. Once the file is modified, if a user chooses to remove the driver information from the answer file, a new answer file must be selected from the service wizard OS page or the data must be removed manually from the existing file.

Having described the invention in terms of a preferred embodiment, it will be recognized by those skilled in the art that various types of general purpose computer hardware may be substituted for the configuration described above to achieve an equivalent result. It will be apparent to those skilled in the art that modifications and variations of the preferred embodiment are possible, which fall within the true spirit and scope of the invention as measured by the following claims.

What is claimed is:

1. A method for providing device driver code so as to permit an existing Operating System to configure itself to communicate with the device driver code, the method comprising:
   a. using a computer system having a memory, display, storage media, a CD-ROM drive and/or floppy disk drive, an input/output system, and an add-device tool;
   b. inputting into the computer the device driver code and related information, the device driver code and related information being stored in one or more files, and entering a pointer to a source path for the operating system and a pointer to an answer file for the operating system; and
   c. executing a code mechanism in the add-device tool to automatically modify the answer file for the operating system and to automatically modify OS installation for the operating system based upon the device driver code and information;
      whereby the operating system can subsequently configure itself to communicate with the device driver.

2. The method of claim 1 comprising the additional steps of invoking on the computer the add-device tool whereby a graphical user interface (GUI) window is displayed, and entering into the GUI window a unique file identification of the file containing the device driver code and information, and entering the pointer to a source path for the operating system and a pointer to an answer file for the operating system.

3. The method of claim 1 wherein the computer is one of a number of computers on an enterprise computing network.

4. The method of claim 3 wherein the add-device tool executes under the control of any program or system of programs that installs an OS.

5. The method of claim 4 wherein the program or system of programs that installs an OS is a Platinum AutoConfigure System.

6. The method of claim 4 wherein the program or system of programs that installs an OS is a Microsoft Systems Management System (SMS).

7. Apparatus for use in a computer system having a memory, display, storage media, a CD-ROM drive and/or floppy disk drive, an input/output system, the apparatus arranged to permit an existing Operating System to configure itself to communicate with device driver code, the apparatus comprising:
   a. device driver code and related information stored in a file in the memory, the file having a unique file identification;
   b. an add-device tool stored in the memory;
   c. the add-device tool configured to recognize the unique file identification of the file containing the device driver code and information, to recognize a pointer to a source path for the operating system and a pointer to an answer file for the operating system; and
   d. a first code mechanism to automatically modify the answer file for the operating system and to automatically modify the OS installation files for the operating system based upon the device driver code and information;
      whereby the operating system can subsequently configure itself to communicate the device driver.

8. The apparatus of claim 7 further comprising a second code mechanism configured to invoke on the computer the add-device tool whereby a graphical user interface (GUI) window is displayed when the add-device tool is invoked, and wherein the unique file identification of the file containing the device driver code and information, to recognize a pointer to a source path for the operating system and a pointer to an answer file for the operating system are entered into the add-device tool using the GUI window.

9. The apparatus of claim 7 wherein the computer is one of a number of computers on an enterprise computer network.

10. The apparatus of claim 8 wherein the add-device tool executes under the control of any program or system of programs that installs an OS.

11. The apparatus of claim 10 wherein the program or system of programs that installs an OS is a Platinum AutoConfigure System.

12. The apparatus of claim 10 wherein the program or system of programs that installs an OS is a Microsoft Systems Management System (SMS).

13. The apparatus of claim 7 wherein the operating system is a Microsoft Windows operating system.

14. A computer program product comprising computer code mechanisms stored on a computer readable medium for in permitting an Operating System to configure itself to communicate with device driver code and related information stored in a file the memory, the file having a unique file identification, the computer code mechanisms comprising:
   a. a first computer code mechanisms to display a graphical user interface (GUI) window which prompts a user to enter the unique file identification of the containing the device driver code and information, a pointer to a source path for operating system and a pointer to an answer file the operating system;

b. a second computer code mechanism to recognize that the unique file identification of the file containing the device driver code and information, a pointer to a source path for the operating system and a pointer to an answer file for the operating system are entered into the GUI window;

c. a third computer code mechanism to automatically modify the answer file for the operating system and to automatically modify the installation files for the operating system based upon the device driver code and information:

whereby the operating system can subsequently configure itself to communicate with the device driver by using the modified answer file and files.

15. A method for providing device driver code so as to permit an existing Operating System to configure itself to communicate with the device driver code, the method comprising:

a. providing a computer system having a memory, display, storage media, a CD-ROM drive and/or floppy disk drive, an input/output system;

b. entering into the computer a unique file identification of a file containing device driver code and information, and entering a pointer to a source path for the operating system and a pointer to an answer file for the operating system;

c. executing a code mechanism in the computer to automatically modify the answer file for the operating system and to automatically modify source files for the operating system based upon the device code and information;

whereby the operating system can subsequently configure itself to communicate with the device driver.

16. The method of claim 1 wherein the operating system is a Microsoft Windows operating system.

* * * * *